United States Patent [19]
Maury et al.

[11] Patent Number: 5,335,949
[45] Date of Patent: Aug. 9, 1994

[54] TELESCOPIC POSITIONING DEVICE

[75] Inventors: Horst Maury, St. Sebastian; Helmut Morgen, Mannebach, both of Fed. Rep. of Germany

[73] Assignee: Stabilus GmbH, Koblenz-Neuendorf, Fed. Rep. of Germany

[21] Appl. No.: 45,492

[22] Filed: Apr. 8, 1993

[30] Foreign Application Priority Data

Apr. 27, 1992 [DE] Fed. Rep. of Germany ....... 4213818

[51] Int. Cl.⁵ .......................... E05C 17/44; F16F 5/00
[52] U.S. Cl. .................................. 292/338; 267/64.12; 267/120; 403/328
[58] Field of Search ................... 292/338; 267/64.12, 267/64.11, 120; 403/108, 109, 328

[56] References Cited

U.S. PATENT DOCUMENTS

| | | | |
|---|---|---|---|
| 4,318,228 | 3/1982 | Kimura | 33/161 |
| 4,779,845 | 10/1988 | Bartesch et al. | 292/338 X |
| 4,867,317 | 9/1989 | Wildemann et al. | 267/64 |
| 5,158,268 | 10/1992 | Schnitzius et al. | 267/64 |
| 5,215,291 | 6/1993 | Bauer et al. | 267/120 |
| 5,275,386 | 1/1994 | Schnitzius et al. | 267/64.12 |

FOREIGN PATENT DOCUMENTS 0432767 6/1991 European Pat. Off. .
2231936 11/1990 United Kingdom .

*Primary Examiner*—Philip C. Kannan
*Attorney, Agent, or Firm*—Brumbaugh, Graves, Donohue & Raymond

[57] ABSTRACT

A pneumatic spring is equipped with a shell tube (12) which is telescopically guided on a pneumatic-spring cylinder (9) and which can snap into different positions. For bolting between the shell tube (12) and the pneumatic-spring cylinder (9), a bolt body (16) is attached to the cylinder bottom (17). In the bolt body (16), a bolt (18) is spring-loaded by a resilient force directed radially outward. In order to bolt the pneumatic-spring cylinder (9) relative to the shell tube (12), the bolt (18) engages in various breaches (19a and 19). Finger pressure required to release the bolting depends on which one of the two relative-shift directions between the pneumatic-spring cylinder (9) and the shell tube (12) is intended. (FIG. 1 )

22 Claims, 4 Drawing Sheets

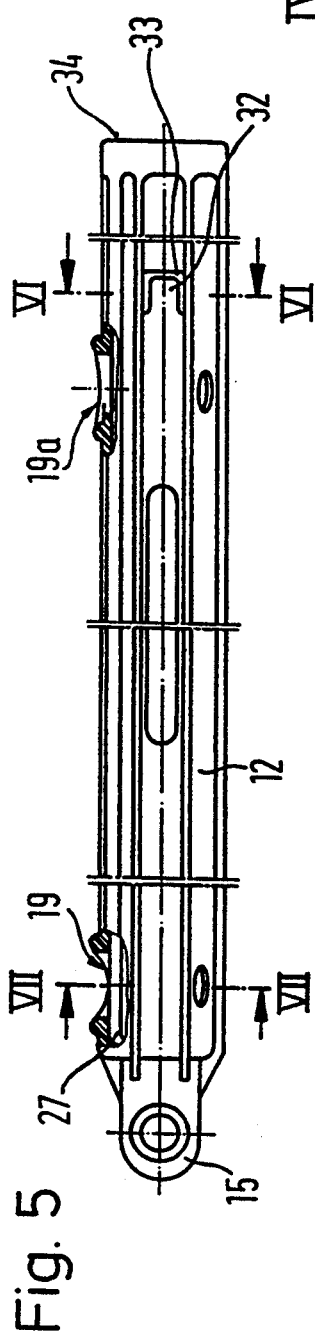
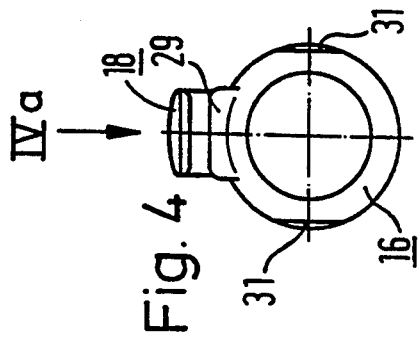
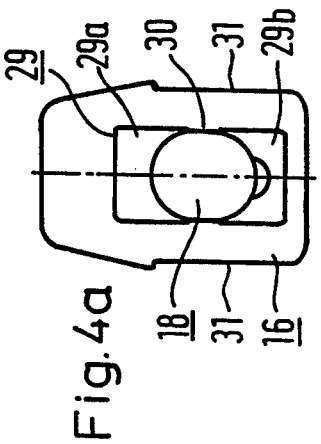
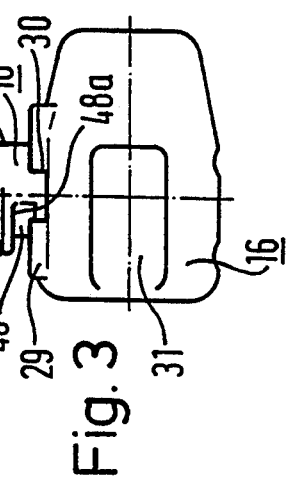
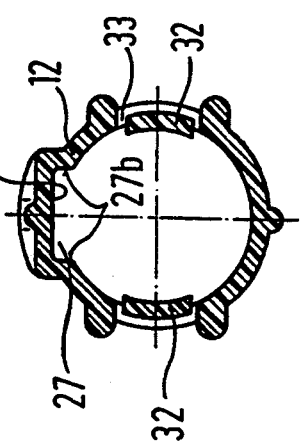

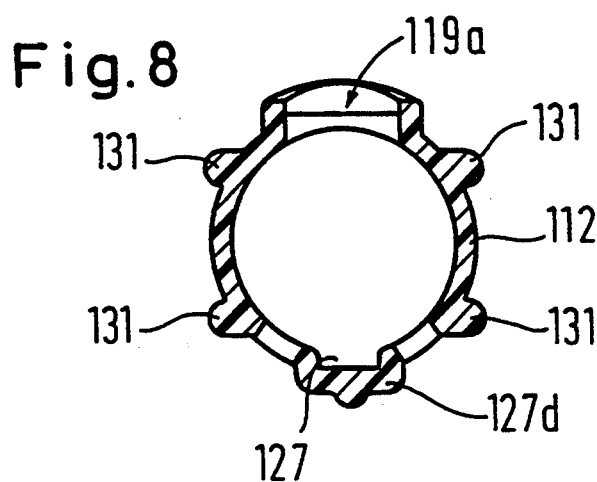
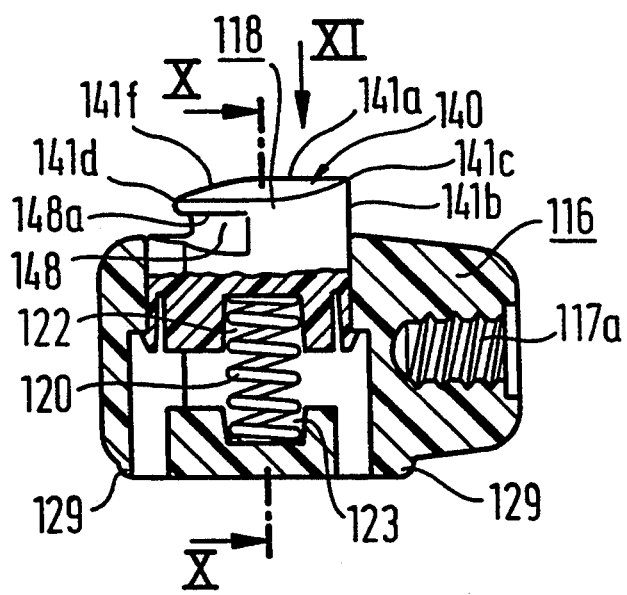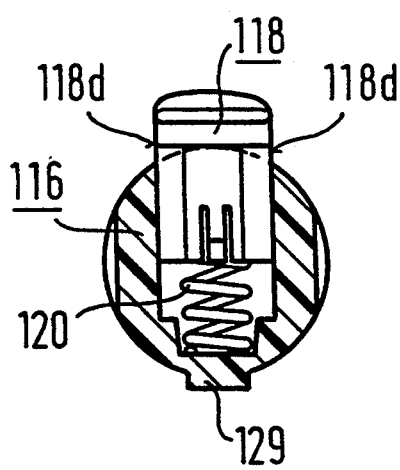
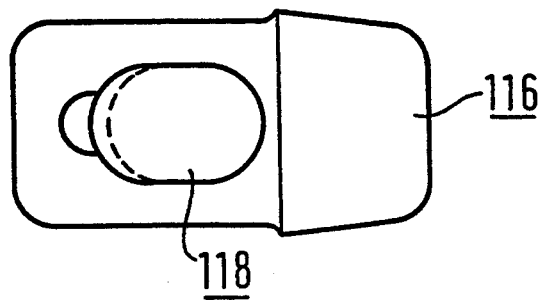

TELESCOPIC POSITIONING DEVICE

BACKGROUND OF THE INVENTION

The invention concerns a telescopic positioning device with an axis, a core component, and a shell component which is shiftable on the core component in an axial direction, with a bolt element provided on the core component for engagement in at least one breach of the shell component, so that, when the bolt element engages in the breach, an axial shifting of core component and shell component is substantially blocked. The bolt element is spring-loaded substantially radially away from the axis in the direction of the bolted position, so that, if the bolt element is placed in radial alignment with the breach, the bolt element necessarily enters into its bolted position, i.e., into the breach. A bolt-releasing surface is provided at the radially outer end of the bolt element, which surface is accessible to the action of external radial forces, e.g., finger action, allowing a radially inward move of the bolt element so that the blocking of the axial shift between the core component and the shell component is released, and so that, after an axial shift has been initiated, a sliding surface of the bolt element enters into sliding engagement with a slideway of the shell component.

Such a telescopic positioning device can be used, e.g., with a pneumatic spring for the opening and positioning of a trunk lid or engine hood of an automotive vehicle. Supporting the opening movement of an engine hood or trunk lid by one or more pneumatic springs has been known for a long time. The pneumatic spring is generally designed such that, perhaps after a manually supported opening operation, it brings the trunk lid or engine hood into the open position by means of the pneumatic spring's push-out force, produced by its compressed-gas content. The spring then maintains the trunk lid or engine hood in this open position. For reclosing the lid or hood, a relatively small force is required, such force supplementing the force-of-gravity moment in overcoming the push-out force of the pneumatic spring. The degree to which an engine hood or trunk lid opens is determined by the stroke of the pneumatic spring. As a rule, there is the option of installing pneumatic springs whose stroke is sufficient to bring the respective body component into an open position that suffices for ordinary operation. However, there also may occur exceptional situations in which a greater degree of opening is desired, e.g., if large bulky objects are to be accommodated in the trunk space of a passenger car or of a hatchback-type vehicle, or if major repairs are to be performed in the engine space of a vehicle. To handle such situations, it is known from German Patent Document P 39 40 916.3 and European Patent Document EP 0 432 767 A1 to slide a shell tube onto the cylinder of the pneumatic spring, the shell tube being axially shiftable with respect to the cylinder. Herein, this shell tube is designated as shell component, and the term core component is used to designate the cylinder of the pneumatic spring. The shell component can have a length about equivalent to the length of the pneumatic-spring cylinder, so that a considerable telescopic path of the shell component with respect to the core component is available. If the opening of one of the automotive-body components is to be set at a degree of opening that exceeds the degree of the opening normally achievable by the moving out of the pneumatic spring, the shell component can be shifted with respect to the core component. In order to attach a pneumatic spring thus modified to the vehicle frame on the one hand, and to the automotive-body component to be pivoted on the other hand, one connecting element is attached, as is customary with pneumatic springs, to the free end of the pneumatic-spring piston, while the other connecting element is attached to the shell component, e.g., to the latter's end that pertains to the bottom of the pneumatic spring.

In order to be able to determine an open position that can be achieved by telescoping the core component out of the shell component, i.e., the pneumatic-spring cylinder out of the shell tube, a bolt element is provided on the core component, which bolt element is capable of engaging into one or several breaches of the shell component. This bolt element is spring-loaded radially outward and necessarily snaps into a breach of the shell component when the open position defined by the position of the breach and of the bolt element has been reached. In this situation, it is customary to attach the bolt element to the end region of the core component (i.e., of the pneumatic-spring cylinder) which is on its bottom side. As a rule, at least two breaches in the shell component are required in order to set the shell component in two positions with respect to the core component, in which case a first position corresponds to the relative position of the shell and core components in which the core component has moved completely into the shell component. The degree of opening of a body component achieved in this relative position of shell and core components corresponds to the opening necessarily produced by the push-out force of the pneumatic spring. However, since one of the connecting elements for linking with the vehicle frame or the movable automotive-body component now no longer is rigidly attached to the core component, but rather to the shell component that is shiftable on the core component, even in the above-mentioned position a bolting of the shell component with respect to the core component is required, since otherwise there would exist the risk, e.g., in the case of a gust of wind on the automotive-body component in its normal open position, that the automotive-body component could be lifted without restriction, the core component being telescoped out of the shell component and, as a result, striking some other portion of the vehicle structure and causing damage therein, or the telescopic guidance between the shell component and the core component being lost and the automotive-body component thereupon dropping back into its closed position, with attendant risk of bodily injury.

A further bolting is required for the shell component's and the core component's length-setting as used in the automotive-body component's open state for special situations.

Accordingly, it is known from the above-referenced German and European patent documents to bolt the shell component with respect to the core component, for one thing in the fully telescoped-in position, and for another to also bolt in a partly telescoped-out position, in which there still remains a sufficient length of guidance between the core component and the shell component.

SUMMARY OF THE INVENTION

With respect to the known solutions, the following problem is recognized for the first time: Typically, the bolting between the shell component and the core component is released by actuator (e.g., finger) pressure on the bolt element protruding through the breach of the shell tube. Resetting from the standard open position to the extra-wide open position and back requires two bolt-releasing operations. These bolt-releasing operations must be carried out by the vehicle holder (often a woman) by finger pressure on the bolt element. The action of an external force upon the bolt element, required for releasing the bolt, should therefore be relatively easy. An easily released bolting, however, represents a risk, particularly if one keeps in mind the fact that the available stroke of the bolt element is limited by the relatively small clearance within a slender shell tube, so that in the bolted state the bolt element cannot protrude very far in a radially outward direction beyond the shell tube. Such an excessive protruding of the bolt element would furthermore be undesirable because in connection therewith there could arise the risk of contact with people or objects close by, which could lead to an unintentional release. Thus, only a limited stroke length is available for the release of the bolt element. A considerable effort is required, in the case of such a limited stroke length, for easy release of the bolting, in combination with risk-free, reliable bolting action.

For further illustration of the problem, the following situation may serve as an example: The shell component is bolted in the telescoped-out position with respect to the core component, by the engagement of the bolt element into an appropriate breach of the shell component. This is the extra-wide open position for special situations in the use of automotive-body components (tail gate or trunk lid). After some time, many times over the lifetime of the vehicle, there is a need to switch back into the standard open position. For this, it is undesirable that an excessive release force upon the bolt element be required. Consequently, one wants the release force on the bolt element, required for releasing followed by telescoping of the core into the shell component, to be relatively small. Moreover, one can accomplish this in relatively risk-free fashion, because once the automotive-body component's extra-wide open position has been reached, the bolt element is additionally secured in its bolted position by the relative force between core component and shell component, derived from the force-of-gravity moment of the automotive-body component, and because one can assume a relatively constant load on the bolt element.

The following situation is now envisaged: The vehicle holder or a person charged with repair work is in the process of shifting the automotive-body component from its standard open position into an extra-wide open position, and at that moment, a gust of wind accelerates the automotive-body component in the direction of increased opening. In that case, there is considerable danger, if the bolt element overshoots the breach in the shell component provided for the extra-wide open position, that a relatively easy bolting does not timely snap in, but slides over this breach. This risk is the greater as the oscillating system consisting of the bolt element and a pre-tensioning spring has a certain time constant, which, in the case of a weak resilient force for easy bolt-releasing, may be too long for timely bolting to prevent an overshooting of the bolt element over the breach, when the core component moves out of the shell component at great speed.

From the above considerations, here presented for the first time to the extent known, there results the task of designing the bolting in a telescopic positioning device of the type described at the outset so that, if it is intended to shift the telescopic component and the shell component relative to each other, the bolting will be relatively easily releasable in a first relative-shift direction, but, on the other hand, the bolting will be relatively hard to release in the case of an attempted axial shift in a second relative-shift direction.

To achieve this task, in the case of a positioning device of the kind defined at the outset, the magnitude of the radial path of the bolt element, required to release the blocking and produced by the action of an external radial force upon the bolt-releasing surface, is made to differ as a function of a subsequent relative-shift direction between core component and shell component, a shorter radial path corresponding to the first relative-shift direction and a longer radial path corresponding to the second relative-shift direction.

By the mere fact that a shorter radial path needs to be produced by external action in order to release the bolting in the first relative-shift direction, and a longer radial path for the other relative-shift direction, the situation described above can be taken into account.

A further improvement may be achieved in that the radial movement of the bolt element along a residual path corresponding to the difference between the longer and the shorter radial path is made more difficult.

In principle, greater difficulty in the radial movement along the residual path can be achieved by a progression in the resilient force of a spring-loading device acting on the bolt element.

A further possibility of making the radial movement along the residual path more difficult consists in that in the vicinity of the breach on the outer side of the shell component a stop surface is provided for a release actuator, e.g., a finger, acting substantially radially upon the bolt-releasing surface, which stop surface permits a shorter radial path of the bolt element, required for the subsequent axial shifting of core and shell components in the first relative-shift direction, but makes more difficult a longer radial path of the bolt element, required for the subsequent axial shifting of core component and shell component in the second relative-shift direction.

As an example, the stop surface can be formed by a finger groove which stops the finger of a person pushing the bolt radially inward. This finger groove can be disposed on the shell component in the vicinity of the respective breach, e.g., in a manner such that the breach margin between the two axial ends of the breach on the outer side of the shell tube is formed in a countersunk fashion.

Differentiation of the required radial path of the bolt element for the subsequent axial shifting in different relative-shift directions can be achieved in various ways. Thus, it would be possible in principle to achieve this differentiation of the radial path by means of the slideways' different radial distances from the axis, on both sides of a breach. In accordance with a preferred form of embodiment, however, a provision is made for the differentiation of the required radial path of the bolt element (for the subsequent axial shifting in different relative-shift directions), to be caused by providing jointly acting camming, placed in axially opposite positions on the bolt element and on a breach margin, which camming causes, at the beginning of an axial shifting into at least one relative-shift direction, an additional radial movement of the bolt element radially inward, beyond a position reached by the action of an external radial force upon the bolt-releasing surface. In principle, camming could be provided at both ends of a breach, the differentiation between the required radial paths being then achieved by a different shape of the camming. The preferred solution is to provide the camming in only one axial end-region of the bolt element and in the pertinent axial end-region of the breach margin.

The bolt-releasing surface also provides an opportunity to be used as a sliding surface, in which case it is recommended that the camming on the bolt element side be produced by profiling an axially-running crest line of the bolt-releasing surface, and that the camming on the breach side be produced on a radially inner end-region of the breach margin.

In a preferred embodiment, which also has advantages with respect to a simple design of the bolt element, the crest line running in an axial direction comprises a section which is substantially parallel to the axis, which section merges at one end into a substantially radial stop edge designed to act jointly with an axial end-region of the breach edge, and at the other end merges into a flank inclined at an acute angle with respect to the axis, which flank is designed to act in cam-like fashion jointly with an opposite axial end-region of the breach margin, the sliding surface being formed in the region of the section that is parallel to the axis.

Under certain circumstances as mentioned above, the bolting action in one relative-shift direction is less critical than the bolting action in another relative-shift direction.

However, the invention also provides an advantageous solution for the case in which an absolutely reliable bolting is to be ensured in both relative-shift directions, while nevertheless the release of the bolting, upon shifting in one relative-shift direction, is relatively easier to accomplish than the release of the bolting in the opposite relative-shift direction. For that purpose, the bolt element in its bolted position is provided with an axial clearance with respect to the breach, and that a radially inward movement of the bolt element is blocked whenever the axial clearance has been used up at least in part, in the first relative-shift direction. For a better understanding of this aspect of the invention, one should once again envisage the situation in which an engine hood or a tailgate of an automotive vehicle is in an extra-wide open position due to the fact that the core component was telescoped out of the shell component and was bolted in this telescoped-out position. If it is now desired to return to the standard open position, this cannot be accomplished in a straightforward manner because the radially inward movement of the bolt element is locked. However, if one now manipulates the automotive-body component by raising it by a few millimeters, which does not require much effort, the axial clearance between the bolt element and the breach is used up in the second relative-shift direction, it then being possible with a relatively short radial path (i.e., easily), to release the bolt element for a subsequent axial shift in the first relative-shift direction. In this fashion, an unintentional release of the bolting for a subsequent axial shift in the first relative-shift direction is necessarily excluded, while a release of the bolting for a subsequent axial shift in the second relative-shift direction is made more difficult by the fact that for such a purpose a longer radial path must be imparted to the bolt element by means of external actuator pressure.

More particularly, the radially inward movement of the bolt element can be locked by locking surfaces on the bolt element and on the breach margin, e.g., in a manner such that a locking surface on the bolt element side is formed by an undercut of the bolt element, which undercut is located radially inward of the bolt-releasing surface, and a locking surface on the breach-margin side is formed by a locking projection of the breach margin, which projection protrudes in an axial direction into the breach.

If there are two axially distanced breaches on the shell component, the invention provides for the following:

In the case of engagement of the bolt element in a first breach, a shorter radial path of the bolt element (caused by the action of an external radial force) is required for the subsequent execution of an axial shift in the first relative-shift direction, which draws the bolt element closer to the second breach; in the case of engagement of the bolt element in this first breach, a longer radial path of the bolt element (caused by the action of an external radial force) is required for the subsequent axial shifting in the second relative-shift direction; in the case of engagement of the bolt element in the second breach for the subsequent axial shifting in the second relative-shift direction, a longer radial path of the bolt element, caused by the action of an external radial force, is required; the radial movement of the bolt element, by the action of an external radial force along a residual path (which is equivalent to the difference between a shorter radial path and a longer radial path), is made difficult to a lesser degree if the bolt element engages in the second breach than if the bolt element engages in the first breach.

When applied to a pneumatic spring with a cylinder operating as a core element, and a shell component telescopically placed over the cylinder, when the core component is telescoped-out with respect to the shell component, the bolt element engages in the first breach. This corresponds to the state of maximum-degree opening of the respective automotive-body component, i.e., engine hood or trunk lid. If one wishes to return from this position to the standard open position, only a short radial path need be imparted manually to the bolt element. On the other hand, a reliable safety is provided against further opening by the fact that, to prepare for such a further opening, the bolt would also have to be shifted further over the residual path. Such further radial shifting of the bolt element over the residual path is made difficult in particular by the fact that, in the vicinity of the first breach, a relatively shallow finger groove is available.

If, however, the bolt element engages in the second breach, this corresponds to the normal opening of the engine hood or the trunk lid. In this case the pneumatic spring is altogether unable to move further with its cylinder into the shell component, because the bottom of the pneumatic spring strikes against the bottom of the shell component. To this extent, there is no problem in this state, with respect to the bolting safety of a subsequent axial shifting in the first relative-shift direction. On the other hand, there continues to exist the problem of bolting safety against the pneumatic-spring cylinder's telescoping out of the shell component, e.g., in view of the risk of a gust of wind capable of independently lifting the respective automotive-body component.

Nonetheless, reliable bolting is ensured because, for releasing with a view to an axial shift in the second relative-shift direction, i.e., with a view to the cylinder's telescoping out of the shell component, a longer radial path of the bolt element is required. Yet, an intentional release of the bolting is made easy by the fact that a relatively deep finger groove in the vicinity of the second breach allows execution of the longer radial path without forceful pressing of the finger against the bottom of the finger groove, i.e., without having to squeeze the flesh of a finger inward between the margins of the finger groove.

In addition, it is possible in this form of embodiment as well, to ensure that, when the bolt element engages in the first breach, the radial inward movement of the bolt element is locked whenever an axial clearance between the bolt element and the first breach has been produced upon axial shifting in the first relative-shift direction. In this case it becomes necessary, for release of the bolting for subsequent axial shifting in the first relative-shift direction, to manually raise the respective automotive-body component a very small distance, before the release of the bolt for a subsequent axial shifting in the first relative-shift direction can take place at all. Thus, once again, the bolting is secured by an additional feature against transfer of the automotive-body component from the extra-wide open position to the standard open position even though the required force acting on the bolt element for the purpose of preparing the axial shifting in the first relative-shift direction is relatively small.

According to the above-identified German and European patent documents, the core component is rotationally secured with respect to the shell component, i.e., in the case of the example, the pneumatic-spring cylinder with respect to the shell tube, in that a linear guideway runs on the shell component in an axial direction, and in that a way-follower element that engages into this linear guideway is attached on the core component. This rotational-security feature ensures, in the case of an axial shifting of the bolt element between a first breach and a second breach, that the bolt element will necessarily find its way into the second breach when it reaches it, even if (as would be possible in principle) such a rotational security feature is not provided by an untwistable fastening of both components, for example, each on a structural component of a super-ordinate structure. According to the above-identified patent documents, this rotational security feature is designed in a manner such that a rotational-security cam is attached to a housing component connected to the bottom of the pneumatic-spring cylinder, and the rotational-security cam engages and slides in a slot of the shell component, which slot is open radially inward. In such a case, the rotational-security cam is disposed axially on both sides of the bolt element in a manner such that the cam engages in the lateral surfaces of the slot while the radially outer end-surface of the bolt element (which surface simultaneously functions as slide surface) acts jointly with the slideway formed by the bottom of the slot, and is not engaged with the lateral surfaces of the slot. In this case, the following difficulty arises: The radially outer end-surface of the bolt element, which surface functions as slide surface and as bolt-releasing surface, must have a relatively large area for painless action by a finger applied for releasing. Specifically, it must have minimum dimensions in both the perimetral and axial direction. Thus, to accommodate the bolt element at all, the lateral surfaces of the slot must have a relatively large distance in the perimetral direction, so that the overall cross section of the shell component must be increased. By contrast, in accordance with an aspect of the invention, the linear guideway of the shell component and the way-follower element of the core component are angularly offset in the perimetral direction around the axis, preferably by 180°, with respect to the bolt element and the breach, there being at least one of the latter. In that case, it is no longer necessary, when dimensioning the width of the linear guideway in the perimetral direction around the axis, to make allowance for the required width of the bolt element in the perimetral direction. Rather, one can then determine the form of the linear guideway and of the way-follower element in it, solely by taking into account the rotational-security function, and making them relatively narrow. This is particularly important when the linear guideway consists of a slot that is open radially inward and closed radially outward. In such a form of embodiment, restricting the peripheral width of the slot results in material savings on one hand, and in greater strength on the other.

It is easily envisaged that, if the slot is made of a relatively thin-walled skin with a shape that externally appears as a rib, the contribution to flexural stiffness of the rib is the greater, the smaller the peripheral distance of the slot's lateral walls.

Compared to the form of embodiment known from the above-mentioned documents, the angular distancing of the way-follower element and of the linear guideway has the further advantage that, though in the known form of embodiment the bolt element is indeed guided by the axially opposite surfaces of two camming components, it is free in the peripheral direction. In accordance with an aspect of the invention, the bolt element can be brought around all the way to the slideway.

BRIEF DESCRIPTION OF THE DRAWING

FIG. 3 is a side view of a bolt body with guide wedge and lateral chamfers;

FIG. 4 is a front view of the bolt body of FIG. 3;

FIG. 4a is a top view of the bolt body of FIG. 3 and 4, in the direction of arrow IVa in FIG. 4;

FIG. 5 is a lateral view of a shell tube with breaches and punched-out spring tongues;

FIG. 6 is a cross section of the shell tube, along the line VI—VI in FIG. 5, with spring tongues pointing radially inward;

FIG. 8 is a cross section of an alternative shell tube embodiment;

FIG. 9 is a longitudinal cross section of an alternative bolt body embodiment;

FIG. 10 is a cross section along the line X—X of FIG. 9;

FIG. 11 is a top view of the bolt body of FIG. 9 in the direction of arrow XI.

DETAILED DESCRIPTION OF PREFERRED EMBODIMENTS

Figure 1:
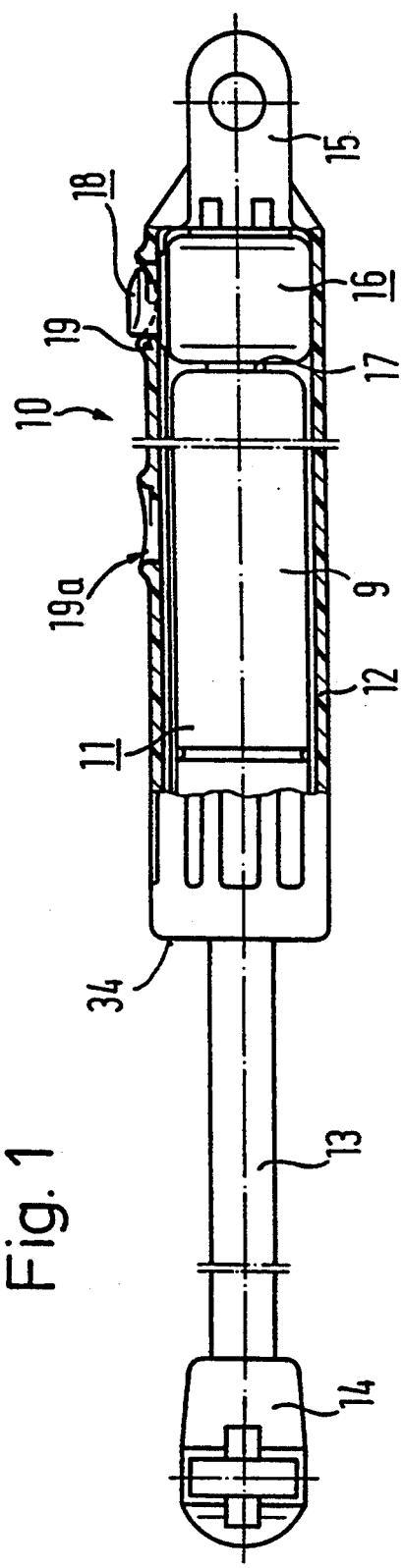
FIG. 1 is a partial cross section of a resetting device with a pneumatic spring, capable of being shifted longitudinally in a shell tube, and of being arrested in various breaches.

The device 10 shown in FIG. 1 consists essentially of a pneumatic spring 11 which is disposed in a longitudinally shiftable manner in a shell tube 12. Pneumatic spring 11 comprises a piston rod 13 which on its side facing away from cylinder 9 has a piston-rod wrist 14. Shell tube 12 is open on one side; piston rod 13 of pneumatic spring 11 is led out of the open end, and, at the closed end, a fastening eye 15 is provided for fastening to the vehicle.

On the side facing away from piston rod 13, the pneumatic spring is connected via a connection 17 with a bolt body 16. As shown in detail in FIG. 2, connection 17 comprises a screw thread 17a with which it is screwed into bolt body 16. Bolt body 16 contains a bolt 18 which is movable against the pressure of a spring 20, crosswise to the longitudinal axis 28 of shell tube 12. Bolt body 16 comprises a bottom 21 in which a lower spring-suspension 23 is provided. Bolt 18 comprises an upper spring-suspension 22 which is aligned with lower spring-suspension 23. Spring 20 in the illustrative embodiment is designed as a helical pressure-spring and is fixed in spring suspensions 22 and 23. A free space 24 is provided between bottom 21 and bolt 18, a space around which bolt 18 is freely movable crosswise to longitudinal axis 28 of shell tube 12.

Near its closed end 12a, shell tube 12 comprises a breach 19, through which spring 20 pushes bolt 18 radially outward and snaps it in. As FIGS. 1 and 2 further show, shell tube 12 comprises along its length at least one more breach 19a, which corresponds to the fully-open position of device 10. Depending on requirements, other breaches may be provided.

In order to prevent bolt 18 from being pushed out of bolt body 16, it is provided with locking tongues 25 which lie against undercuts 26 of bolt body 16 and thus restrict the radial movement of bolt 18.

As shown in FIGS. 3 and 4, bolt body 16 comprises a guide cam 29 which is guided in the lengthwise slot 27 of shell tube 12, whereby guide cam 29 supports bolt body 16 against twisting and prevents the transfer of twisting stresses onto bolt 18. Thus, bolt 18 is guided free of twisting stresses and is capable of being pushed inward in the region of a breach 30 of guide cam 29.

To allow the connection of bolt body 16 with pneumatic spring 11, as shown in FIG. 4, chamfers 31 are provided, facing each other and offset by about 90° to guide cam 29. Chamfers 31 serve as wrench surfaces for an appropriate tool, with which a rotational moment for screwing-on may be applied.

Shell tube 12 shown in FIG. 5 comprises, in addition to breaches 19 and 19a, spring tongues 32 as shown in detail in FIG. 6. Spring tongues 32 are bent radially inward from shell tube 12 into U-shaped punch-outs 33 in the region of the open end 34 or the breach 19a. When the pneumatic spring 11 is in use, spring tongues 32 lie against it and prevent a radial relative shift. This prevents the generation of noise by radial relative movements between shell tube 12 and pneumatic spring 11. While the illustrative embodiment shows two opposing spring tongues 32, a plurality of spring tongues may be distributed over the perimeter if necessary. In another design, several spring tongues 32 pointing radially inward can be distributed over the length of shell tube 12.

Figure 7:
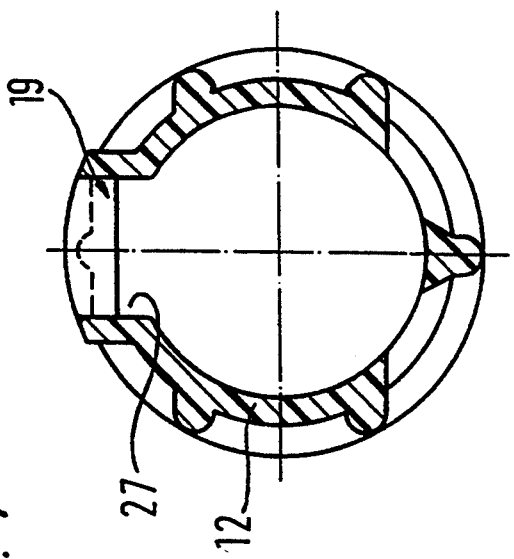
FIG. 7 is a cross section of the shell tube, along the line VII-VII in FIG. 5.

As shown in FIG. 7, shell tube 12 is provided inside with a lengthwise slot, along which cam 29 slides. Bolt 18 is securely guided by cam 29 in lengthwise slot 27, so that, after its release, the bolt will reliably find the next bolt snap 19 or 19a and, due to the pressure of spring 20, will again reliably snap in. Twisting of pneumatic spring 11 in shell tube 12 upon release of bolt 18 is also prevented. Thus, unintentional and excessive movement of pneumatic spring 11 out of shell tube 12 is reliably avoided.

In FIGS. 1-6, 19a designates a first breach and 19 a second breach. At its radially outer end, bolt 18 is provided with a bolt-releasing surface 40 whose crest line is designated 41. Crest line 41 comprises a section 41a, parallel to the axis, which merges into a stop flank 41b and into a cam flank 41f which is inclined at an acute angle with respect to the axial direction A.

When bolt 18 engages into the first breach 19a, stop flank 41b of bolt 18 lies against a counter-stop edge 43 of breach margin 42. In the bolted position, the location of bolt 18 is determined by the stopping of locking tongues 25 against undercut 26. For release of bolt 18 from the first breach 19a for a subsequent further shifting of pneumatic-spring cylinder 9 to the left, it is necessary to radially push in bolt 18 to such an extent that the transition edge 41c is shifted to a point below edge 43a. To this end, it is necessary to push in bolt 18 over a longer radial path H. Such radially inward pushing of bolt 18 over the radial path H is, first, counteracted by the rising return force of helical pressure-spring 22. Second, pushing-in over the long radial path H is made more difficult as the finger pushing against bolt-releasing surface 40 comes to lie against a stop surface 44, before the edge 41c reaches the level of edge 43a. As a result, further pushing-in of bolt 18 is only possible by distorting the flesh of the finger in the region of finger groove 45. This ensures that bolt 18 can be pushed only with difficulty into a released position in which cylinder 9 can then be pushed out completely from shell tube 12.

On the other hand, releasing the bolt for a subsequent inward shifting of pneumatic-spring cylinder 9 in the direction of the closed end 12a of the shell tube 12 is much easier. All that is required is to push edge 41d at the end of the cam flank 41f beneath the edge 46 of breach margin 42, i.e., merely to move bolt 18 radially inward over a short radial path h. Once edge 41d has reached a point radially inward of edge 46 of breach margin 42, it suffices to shift cylinder 9 in the axial direction A towards the closed end 12a of shell tube 12. The required differential radially-inward movement, H minus h, is then achieved by the cam-like joint action of flank 41f and edge 46, until section 41a of crest line 41, which section is parallel to the axis, comes to lie against slideway 27a of lengthwise slot 27. Cylinder 9 can then be pushed in substantially without any mechanical resistance.

Because a pneumatic spring mounted in an automotive vehicle is always stressed by gravity action in the direction of the closed end 12a, there is no difficulty in overcoming the resistance against pushing in, caused by the engagement of cam flank 41f with edge 46.

Figure 2:
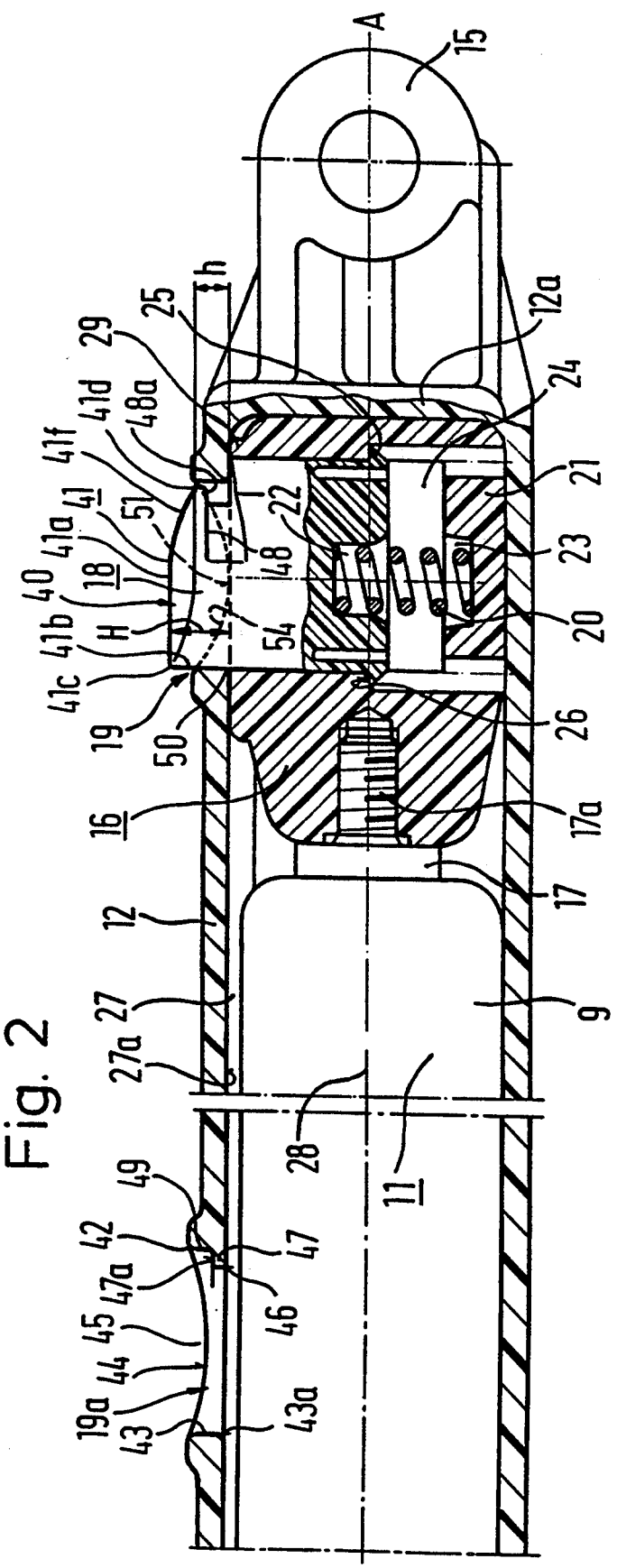
FIG. 2 is a partial cross section of a bolt body on a pneumatic spring, with a bolt element arrested in a breach.

FIG. 2 shows a locking projection 47 protruding from the breach margin 42 into the first breach 19a. This locking projection 47 comprises a locking surface 47a that is directed radially outward. On the opposite side, a undercut 48 with a locking surface 48a is disposed on bolt 18.

Under the assumption of bolt 18 engaging into the first breach 19a, locking surface 48a is located radially outside locking surface 47a of locking projection 47. Also, bolt 18 has some axial clearance in an axial direction A with respect to the first breach 19a. If stop flank 41b lies against stop edge 43, locking surface 48a is radially outside the overlap with locking surface 47a, and bolt 18 can be pushed in radially inward over the short path h required to initiate a subsequent shifting of cylinder 9 in the direction of the closed end 12a of shell tube 12. If, however, bolt 18 is pushed to the right within first breach 19a (taking advantage of the axial clearance) to such an extent that edge 41d lies against edge 49 of the breach margin 42, locking surface 48 is in radial overlap with locking surface 47a, and a radially inward pushing-in of bolt 18, i.e., release of bolt 18, becomes impossible.

Under the assumption that the device according to FIG. 2 is mounted between the vehicle chassis and the trunk lid of an automotive vehicle, the device is stressed in an axial direction, and the previously described situation prevails as edge 41d lies against edge 49. As a result, the bolt cannot be simply shifted radially inward. Rather, it will first be necessary, by manual effort exerted on the trunk lid, to pull the pneumatic-spring cylinder out of shell tube 12 to such an extent that stop flank 41b strikes against stop edge 43. Only then can bolt 18 be moved radially inward over the path h for the purpose of releasing the bolt, then to have cam flank 41f slide below edge 43. Thus, it is ensured that the bolting operates reliably even for a subsequent movement of pneumatic-spring cylinder 9 in the direction of the end 12a, although the radial releasing movement of bolt 18 needs to be carried out over a short path only, and can be achieved by slight finger pressure. If bolt 18 is located in the second breach 19, releasing the bolt requires a shifting of bolt 18 radially inward over the radial path H until edge 41c lies radially within edge 50. Thus, a relatively long stroke H is required for releasing the bolt. As a result, the bolting is very reliable, as it is assured that, in the standard open position, the trunk lid cannot be torn open by a gust of wind. Nevertheless, the bolting is easily releasable in this state as well, because, during radial finger pressure upon bolt 18, the finger does not reach the stop surface 51 of a finger groove 54, which is significantly deeper than the shallow finger groove 45, or only does so shortly before edge 41c passes edge 50.

FIG. 4a shows guide cam 29, subdivided into two component cams 29a and 29b, the guide cam engaging in the lengthwise slot 27. Cams 29a and 29b lie against the side surfaces 27b of the lengthwise slot 27 in a manner substantially without clearance. Thus, the rotational security of bolt body 16, which is also the bolt housing of bolt 18, is formed exclusively by component cams 29a and 29b, while bolt 18 remains free of any contact with lateral surfaces 27b and therefore cannot become wedged in.

FIGS. 8, 9, 10, and 11 show a variant embodiment. Analogous components are designated the same as in FIGS. 1–7.

As contrasted with the embodiment according to FIGS. 1–7, in the embodiment according to FIGS. 8–11, guide cam 129 is shifted with respect to bolt 118 by 180°, and lengthwise slot 127 is shifted with respect to breach 119a by 180°. As a result, lengthwise slot 127 can be kept narrow, regardless of the perimeter width of bolt 118, and in accordance with guide cam 129. This results in a saving of material, and also in the rib 127d, formed on the outside of shell tube 112 in the region of lengthwise slot 127, significantly contributing to flexural stiffening of shell tube 112. Such flexural stiffening is the more effective as it is uninterrupted by breaches. Thus, rib 127d together with ribs 131, can ensure high flexural and buckling strengths of shell tube 112.

There is a further beneficial effect in that bolt 118 is guided laterally, even in its regions 118d, to the margin of the breach 119a.

As in the embodiments according to FIGS. 1–7, bolt body 116 and shell tube 112 can easily be injection molded or pressure molded, including bolt 118. Also, the pneumatic spring can be shaped in conventional form, with the bolt body 116 being screwed by means of thread 117a onto a threaded pin on the pneumatic-spring bottom, which, in conventional pneumatic springs, is used to attach an articulated eye.

The provision of finger grooves with different depths for different breaches is a significant distinguishing features of the invention, for application in telescopic positioning devices with several bolted positions, even independently of different radial paths of the bolt element for different intended relative-shift directions. By this distinguishing feature, i.e., by different finger-groove depths, there results a difference for several bolted positions, between those positions in which a particularly secure bolting is necessary and those in which an easy release of the bolt is required.

Further with respect to FIG. 2, the locking tongues 25 with the undercuts 26 are important, particularly for a captive pre-assembly of bolt element 18 in bolt body 16. Once bolt body 16 has been introduced in shell tube 12, bolt element 18 is radially fixed by shell tube 12 when the bolt element reaches through one of breaches 19, 19a, as the cross-section of bolt element 18 within bolt body 16 in the axial direction is greater than breaches 19, 19a. As a result, after the pneumatic spring and the shell tube have been assembled, in the region of undercut 48, bolt element 18 necessarily lies against the inner-perimeter surface of shell tube 12, so that the engagement of locking tongues 25 in undercut 26 is then no longer required to fix the radially outer position of bolt element 18. In this case, locking tongues 25 reassume a loss-securing function only if the pneumatic spring is pulled out of shell tube 12 for some reason.

We claim:

1. A telescopic positioning device having an axis (A) and comprising a core component (9), a shell component (12) which is shiftable on the core component (9) in the direction of the axis (A), and a bolt element (18) attached to the core component (9) for engagement into at least one breach (19a) of the shell component (12), so that, when the bolt element (18) engages in the breach (19a), relative axial shifting of the core component (9) and the shell component (12) is substantially blocked, the bolt element (18) being spring-loaded radially away from the axis (A) toward a bolted position, so that, when the bolt element (18) is set in radial alignment with the breach (19a), the bolt element (18) enters into its bolted position in the breach (19a), a bolt-releasing surface (40) being disposed at a radially outer end of the bolt element (18), accessible to the action of external radial forces and allowing a radially inward movement of the bolt element (18) for unblocking axial shifting between the core component (9) and the shell component (12), so that, after an axial shifting has been initiated, a sliding surface (40) of the bolt element (18) enters into sliding engagement with a slideway (27a) of the shell component (12), the bolt element (18) having a radial path (H, h) with first and second travel lengths for unblocking, the lengths being different as a function of relative-shift direction of an intentional axial shift between the core component (9) and the shell component (12), a shorter travel length (h) corresponding to a first relative-shift direction, and a longer travel length (H) corresponding to a second relative-shift direction opposite to the first relative-shift direction.

2. The telescopic positioning device of claim 1, wherein the radial movement of the bolt element (18), under the action of an external radial force, requires a greater force along a residual path (H-h) having a length which is equal to the difference between the lengths of the longer radial path (H) and the shorter radial path (h).

3. The telescopic positioning device of claim 2, wherein the greater force is to overcome a resilient force of a spring-loading device (22) acting on the bolt element (18).

4. The telescopic positioning device of claim 2, wherein, in the vicinity of the breach (19a), a stop surface (44) is provided for a substantially radially-acting release actuator, the stop surface (44) permitting a shorter radial path (h) for axial shifting of the core component (9) relative to the shell component (12) in the first relative-shift direction, and a longer radial path (H) for axial shifting of the core component (9) relative to the shell component (12) in the second relative-shift direction.

5. The telescopic positioning device of claim 1, wherein the bolt element is provided with jointly-acting radial camming (41f, 46) for the first and second travel lengths, and with a breach margin (42), so that, at the beginning of an axial shift in at least one relative-shift direction, an additional radial movement of the bolt element (18) is produced radially inward, beyond a position reached by the action of an external radial force on the bolt-releasing surface (40).

6. The telescopic positioning device of claim 5, wherein the camming (41f, 46) is provided, exclusively, in an axial end-region of the bolt element (18) and in an axial end-region (49) of the breach margin (42).

7. The telescopic positioning device of claim 5, wherein camming on the bolt element (41f) comprises a profiled, axially-running crest of the bolt-releasing surface (40), and wherein camming on the breach-margin side (46) is effected on a radially inner end-region of the breach margin (42).

8. The telescopic positioning device of claim 7, wherein the axially-running crest (41) comprises a section (41a) which is substantially parallel to the axis, which merges at one end into a substantially radial stop flank (41b), for joint action with an axial end-region (43) of the breach margin (42), and which merges at another end into a flank (41f) which is inclined at an acute angle toward the axis (A) for cam-like joint action with an opposing axial end-region (46) of the breach margin (42), and wherein the sliding surface (40) is formed in the region of the section (41a) parallel to the axis (A).

9. The telescopic positioning device of claim 1, wherein, in a bolted position, the bolt element (18) has an axial clearance with respect to the breach (19a), and locking of radially inward movement of the bolt element (18) when the axial clearance is used up at least in part by axial shifting in the first relative-shift direction.

10. The telescopic positioning device of claim 9, wherein the radially inward movement of the bolt element (18) is lockable by locking surfaces (48a, 47a) on the bolt element (18) and on the breach margin (42).

11. The telescopic positioning device of claim 10, wherein the locking surface (48a) on the bolt-element is formed by an undercut (48) of the bolt element (18), located radially inward from the bolt-release surface (40), and wherein the locking surface (47a) on the breach-margin (42) is formed by a locking projection (47) of the breach margin (42), protruding in an axial direction into the breach (19a).

12. The telescopic positioning device of claim 1, comprising at least two axially distanced breaches (19a, 19) in the shell component (12), the shorter radial path (h) of the bolt element (18) corresponding to engagement with the first breach (19a) for axial shifting in the first relative-shift direction, bringing the bolt element (18) closer to the second breach (19), the longer radial path (H) of the bolt element (18) corresponding to engagement with the first breach (19a) for axial shifting in the second relative-shift direction, the longer radial path (H) of the bolt element (18) further corresponding to engagement in the second breach (19) for axial shifting in the second relative-shift direction, the radial movement of the bolt element (18), along a residual path (H-h) having a length which is equal to the difference between the lengths of the longer (H) and the shorter (h) radial paths, being less difficult when the bolt element (18) engages in the second breach (19) as compared with the first breach (19a).

13. The telescopic positioning device of claim 12, wherein, when the bolt element (18) engages in the first breach (19a), the radially inward movement of the bolt element (18) is locked whenever an axial clearance between the bolt element (18) and the first breach (19a) is used up by axial shifting in the first relative-shift direction.

14. The telescopic positioning device of claim 12, wherein, when the bolt element (18) engages in the first breach (19a), the shell component (12) assumes a position in which the positioning device is extended with respect to the core component (9), and wherein, when the bolt element (18) engages in the second breach (19), the shell component (12) assumes a position in which the positioning device is shortened with respect to the core component (9).

15. The telescopic positioning device of claim 14, wherein, in the shortening position, the core component (9) is adjacent to a bottom (12a) of the shell component (12).

16. The telescopic positioning device of claim 1, wherein:

the core component (9) comprises a cylinder (9) of a pneumatic spring (11), the shell component (12) has a bottom (12a) and an open end (34), a connecting element (15), for connecting to a structural component of a super-ordinate structure, is attached to the bottom (12a) of the shell component (12), a piston rod (13) of the pneumatic spring (11) is led out of the end of the cylinder (9), distant from the bottom (12a) of the shell component (12), at the outer end of the piston rod (13), a further connecting element (14) is attached, for connecting to a structural component of a superordinate structure, the bolt element (18) is attached to the cylinder (9) in an end section which faces the bottom (12a) of the shell component (12).

17. The telescopic positioning device of claim 1, wherein the core component (9) is guided in an untwistable manner with respect to the shell component (112) by means of a linear guideway (127) on the shell component (112) and of a way-follower element (129) which engages in the way-follower element, and wherein the way-follower element (129) and the linear guideway (127) are angularly offset in the perimetral direction around the axis (A), with respect to the bolt element and the breach (119a).

18. The telescopic positioning device of claim 17, wherein the angular offset is 180°.

19. The telescopic positioning device of claim 17, wherein the linear guideway (127) is formed by a slot (127) which is open radially inward, closed radially outward, and open at least at one axial end (34) of the shell component (112), and wherein the way-follower element (129) comprises a rotational-security cam (129) which engages in the slot (127).

20. The telescopic positioning device of claim 19, wherein the slot (127) is formed by an axially-running rib (127d) which projects radially outward from the shell component (112).

21. The telescopic positioning device of claim 17, wherein the bolt element (118) is in a bolt housing (116) manufactured separately from the core component (9), and wherein the way-follower element (129) is attached to the bolt housing (116).

22. A telescopic positioning device having an axis (A) and comprising a core component (9), a shell component (12) which is shiftable on the core component (9) in the direction of the axis (A), and a bolt element (18) attached to the core component (9) for engagement into at least two breaches (19a, 19) of the shell component (12), so that, when the bolt element (18) engages the breaches (19a, 19), relative axial shifting of the core component (9) and the shell component (12) is substantially blocked, the bolt element (18) being spring-loaded radially away from the axis (A) toward a bolted position, so that, when the bolt element (18) is set in radial alignment with one of the breaches (19a, 19), the bolt element (18) enters into its bolted position in the one breach (19a, 19), a bolt-releasing surface (40) being disposed at a radially outer end of the bolt element (18), accessible to the action of external radial forces and allowing a radially inward movement of the bolt element (18) for unblocking axial shifting between the core component (9) and the shell component (12), so that, after an axial shifting has been initiated, a sliding surface (40) of the bolt element (18) enters into sliding engagement with a slideway (27a) of the shell component (12), stop surfaces (44, 51) being provided on the shell component (12), for a release actuator acting on the bolt-releasing surface (40) in a substantially radial manner, and, for different breaches (19a, 19), the stop surfaces (44, 51) having different radial distances from the axis (A).

* * * * *